United States Patent
Mejri et al.

(10) Patent No.: US 10,200,153 B2
(45) Date of Patent: Feb. 5, 2019

(54) PARAMETERIZED SEQUENTIAL DECODING

(71) Applicant: INSTITUT MINES-TELECOM, Paris (FR)

(72) Inventors: Asma Mejri, Antibes (FR); Mohamed-Achraf Khsiba, Paris (FR); Ghaya Rekaya Ben-Othman, Paris (FR)

(73) Assignee: INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/355,311

(22) Filed: Nov. 18, 2016

(65) Prior Publication Data

US 2017/0149533 A1    May 25, 2017

(30) Foreign Application Priority Data

Nov. 20, 2015 (EP) .................................. 15306847

(51) Int. Cl.
*H04L 1/00* (2006.01)
*H04L 25/03* (2006.01)

(52) U.S. Cl.
CPC ...... *H04L 1/0052* (2013.01); *H04L 25/03184* (2013.01); *H04L 25/03191* (2013.01);
(Continued)

(58) Field of Classification Search
CPC ............. H04L 1/0052; H04L 25/03891; H04L 25/03203; H04L 25/03305; H04L 25/03191; H04L 25/03184
See application file for complete search history.

(56) References Cited

U.S. PATENT DOCUMENTS

2007/0291882 A1* 12/2007 Park .................. H04L 25/03006
375/347
2013/0051502 A1   2/2013 Khayrallah et al.

FOREIGN PATENT DOCUMENTS

| EP | 14306517.5 A1 | 3/2016 |
| EP | 3104564 A1 | 12/2016 |
| EP | 3104565 A1 | 12/2016 |

OTHER PUBLICATIONS

W. Abediseid and Mohamed Oussama Damen. "Lattice Sequential Decoder for Coded MIMO Channel: Performance and Complexity Analysis". CoRR abs/1101.0339 (2011).
(Continued)

*Primary Examiner* — Vineeta S Panwalkar
(74) *Attorney, Agent, or Firm* — Meagher Emanuel Laks Goldberg & Liao, LLP

(57) ABSTRACT

There is provided a decoder for sequentially decoding a data signal received through a transmission channel in a communication system, said data signal carrying transmitted symbols, said decoder comprising a symbol estimation unit (301) configured to determine estimated symbols representative of the transmitted symbols carried by the received signal from information stored in a stack, said symbol estimation unit (301) being configured to iteratively fill the stack by expanding child nodes of a selected node of a decoding tree comprising a plurality of nodes, each node of the decoding tree corresponding to a candidate component of a symbol of said data signal and each node being assigned a metric, the stack being filled at each iteration with a set of expanded child nodes and being ordered by increasing values of the metrics assigned to the nodes, the selected node for each iteration corresponding to the node being assigned the lowest metric in the stack, the decoder comprising a metric determination unit (302) configured to determine an initial metric for each child node of said set of expanded (Continued)

child nodes, wherein the decoder further comprises a modified metric calculation unit (303) configured to calculate a modified metric for at least one of the expanded child nodes from the metric associated with said expanded child node and a weighting coefficient, said weighting coefficient being a function of the level of said node in the decoding tree, the decoder assigning said modified metric to said at least one of the expanded child nodes.

14 Claims, 6 Drawing Sheets

(52) U.S. Cl.
CPC .. *H04L 25/03203* (2013.01); *H04L 25/03305* (2013.01); *H04L 25/03891* (2013.01)

(56) References Cited

OTHER PUBLICATIONS

E. Viterbo and J. Boutros. A universal lattice code decoder for fading channels. IEEE Transactions on Information Theory, 45(5):1639-1642, Jul. 1999.

C. P. Schnorr and M. Euchner. Lattice basis reduction: Improved practical algorithms and solving subset sum problems.In Math. Programming, pp. 181-191, 1993.

F. Jelinek. Fast sequential decoding algorithm using a stack. IBM J. Res. Dev., 13(6):675-685, Nov. 1969.

R. Fano. A heuristic discussion of probabilistic decoding. IEEE Transactions on Information Theory, 9(2):64-74, Apr. 1963.

O. Shalvi, N. Sommer, and M. Feder, Signal codes: Convolutional lattice codes, IEEE Transactions on Information Theory, 57(8):5203-5226, Aug. 2011.

J. -C. Belfiore, G. Rekaya, E. Viterbo , The Golden Code: A 2x2 Full-Rate Space-Time Code with Non-Vanishing Determinants, , IEEE Transactions on Information Theory, vol. 51, No. 4, pp. 1432-1436, Apr. 2005.

European Search Report for 15306847.3 dated Sep. 16, 2016.

Murugan, A D et al., "A unified framework for tree search decoding: rediscovering the sequential decoder", IEEE Transactions on Information Theory, IEEE Press, USA, vol. 52, No. 3, Mar. 1, 2006 (Mar. 1, 2006), pp. 933-953.

Rekaya Ben-Othman, Ghaya, et al., "The Spherical Bound Stack Decoder", Newtorking and Communications, 2008. WIMOB '08. IEEE International Conference on Wireless and Mobile Computing, IEEE, Piscataway, NJ, USA, Oct. 12, 2008 (Oct. 12, 2008), pp. 322-327.

Ouertani, R. et al., "An Adaptive MIMO Decoder", 2009 IEEE 69th Vehicular Technology Conference: Apr. 26-29, 2009, Barcelona, Spain, IEEE, Piscataway, NJ, USA, Apr. 26, 2009 (Apr. 26, 2009), pp. 1-5.

Abdellatif, Salah: "Low complexity decoding schemes for MIMI systems", Mar. 25, 2012 (Mar. 25, 2012), pp. 1-175.

\* cited by examiner

PARAMETERIZED SEQUENTIAL DECODING

BACKGROUND

The invention generally relates to digital communication and in particular to methods, systems, and computer program products for sequentially decoding a received data signal.

Over the past decades, major advances have been achieved to deploy wireless communication systems providing different types of communication. Wireless communication systems provide users access to one or more resources (e.g., bandwidth, transmit power, etc.). Different wireless communication systems are available today, such as the cellular and wireless ad-hoc networks accommodating single or multiple transmitters/receivers using single or multiple antennas, such as MIMO (Multiple Input-Multiple Output) systems.

In addition to low-power consumption and memory requirements imposed by the system devices, a major challenge of wireless communication systems is the decoding of the received signals. Indeed, in a wireless communication system, the signals transmitted to one or more receivers are conveyed in a transmission channel which may be noisy. The signals received by a receiver can thus be disturbed. A decoder is thus required to decode the original desired signal correctly.

Optimal decoding methods are based on a decoding problem known as the "Maximum Likelihood" decoding problem (also called "ML" decoding) to estimate the closest vector to the observed received signal under the minimization of an Euclidean distance criterion. One implementation of the ML decoding criterion uses an exhaustive search over all the possible values in the constellation alphabet. This method provides optimal performance. However, it requires a high complexity that increases as the size of the constellation codebook or the number of the transmit antennas becomes higher, thereby making the implementation of such techniques impossible in practical systems. The implementation of such ML decoding techniques is thus impossible in practical systems requiring a high constellation order to guarantee a high spectral efficiency as well as an increasing number of antennas for ensuring a higher diversity order.

Other ML criterion-based decoding techniques have been proposed to properly decode the received signal while considering the decoder complexity, such as the Sphere Decoder (E. Viterbo and J. Boutros. A universal lattice code decoder for fading channels. IEEE Transactions on Information Theory, 45(5):1639-1642, July 1999) or the Schnorr-Euchner decoder (C. P. Schnorr and M. Euchner. Lattice basis reduction: Improved practical algorithms and solving subset sum problems. In Math. Programming, pages 181-191, 1993). However, these decoders have an increasing complexity as the constellation size or the number of antennas increases. Other suboptimal low-complexity decoders, such as the ZF (Zero-Forcing), the ZF-DFE (Zero Forcing-Decision Feedback Equalizer) and the MMSE (Minimum Mean Square Error) detector are implemented in practical systems but present poor performances in terms of the achievable diversity order and so on error performance.

Still other decoding algorithms applicable in linear communication systems, using single or multiple users and/or antennas, include the lattice sequential decoders (such as the "stack" decoder) which implement the optimal ML detection (also referred to as 'decoding') criterion using a tree representation of the ML optimization problem (decoding tree) and a tree search. Such decoding algorithms provide a reduced complexity with respect to the exhaustive search approach. In the decoding tree, each path from the root node to a leaf node is a possible transmitted signal. Nodes in the decoding tree correspond to different values taken by the decoded symbols and each path from the root node to a leaf node is a possible transmitted signal. According to the search strategy implemented by sequential decoders, the expanded tree nodes are stored in a global stack. In particular, the stack decoder stores, in the global stack, the tree nodes expanded during the decoding process and sort them according to an increasing order of their decoding metrics.

Sequential decoders include decoders implementing a Best-First tree search such as the Stack decoder as disclosed in:

A. R. Murugan, H. El-Gamal, M.-O. Damen, and G. Caire. A unified framework for tree search decoding: Rediscovering the sequential decoder. IEEE Transactions on Information Theory, 52(3):933-953, March 2006;

F. Jelinek. Fast sequential decoding algorithm using a stack. IBM J. Res. Dev., 13(6):675-685, November 1969.

Another type of lattice sequential decoding method using a Best-First tree search is known as the Fano decoding method as disclosed in R. Fano. A heuristic discussion of probabilistic decoding. IEEE Transactions on Information Theory, 9(2):64-74, April 1963.

Sequential decoders improve the overall decoding complexity. However, for an increasing constellation size and a high number of antennas, the stack decoding technique requires a high computational complexity. In order to reduce this complexity, another decoding technique referred to as the Spherical-Bound Stack decoder (SB-Stack) has been proposed in the article by G. R. Ben-Othman, R. Ouertani, and A. Salah, entitled "The Spherical Bound Stack Decoder", In Proceedings of International Conference on Wireless and Mobile Computing, pages 322-327, October 2008. The SB-stack approach combines the Stack search strategy with the Sphere Decoder search region: the decoder searches for the closest vector inside a sphere centered at the received point implementing the stack decoding strategy. The spherical search region imposes a search interval for each detected symbol. Only nodes belonging to these intervals at each tree level are visited and expanded.

Lattice sequential decoders have strongly imposed themselves as optimal detection schemes in linear wireless communication systems reducing the optimal ML decoding problem to the search for the path in a graph-tree having the least cumulated metric.

In a conventional sequential decoder, to determine a best fit (path), a value is assigned to each node in the tree. This value is called the metric which is given by (8).

In some conventional approaches, the path metric for each node at a given level k of the decoding tree may be reduced of a term "b×k" which depends on a bias term b and on the level k.

The bias term allows controlling the amount of computations performed by the decoder. Also, the bias term makes it possible to achieve a plethora of performance-complexity tradeoffs of the decoder.

With the introduction of a bias term b in the ML metric, parameterized sequential decoders including the Stack, Fano and SB-Stack decoders, offer a flexibility in terms of performance-complexity tradeoffs. The selection of the bias in spatially multiplexed and coded MIMO systems is generally fixed deterministically without taking into account the channel statistics or the noise level. In other approaches using convolutional codes, such as the approach disclosed in R.

Fano. A heuristic discussion of probabilistic decoding. IEEE Transactions on Information Theory, 9(2):64-74, April 1963, an optimized value for the bias is defined which corresponds to the coding rate of the underlying code. For convolutional lattice coding joint to Tomlinson-Harashima shaping, as described in O. Shalvi, N. Sommer, and M. Feder, Signal codes: Convolutional lattice codes, IEEE Transactions on Information Theory, 57(8):5203-5226, August 2011, the optimized value of the bias for high (Signal-to-Noise Ratio) SNR regime is defined as $$:b_{adap} = \sigma^2 \log\left(\frac{4}{\pi\sigma^2}\right)$$

where $\sigma^2$ designates the variance of the additive noise.

However, in the existing approaches, the bias parameter is set up uniformly, whatever the selection criterion of the bias parameter is, for all the levels of the decoding tree. In other words, the value of the bias parameter is the same for all the tree levels, which results in an insufficient flexibility in terms of performance/complexity.

SUMMARY

In order to address these and other problems, there is provided a decoder for sequentially decoding a data signal received through a transmission channel in a communication system, the data signal carrying transmitted symbols, the decoder comprising a symbol estimation unit configured to determine estimated symbols representative of the transmitted symbols carried by the data signal from information stored in a stack. The symbol estimation unit is configured to iteratively fill the stack by expanding child nodes of a selected node of a decoding tree comprising a plurality of nodes, each node of the decoding tree corresponding to a candidate component of a symbol of the received data signal and each node being assigned a metric, the stack being filled at each iteration with a set of expanded child nodes and being ordered by increasing values of the metrics assigned to the nodes, the selected node for each iteration corresponding to the node being assigned the lowest metric in the stack. The decoder comprises a metric determination unit configured to determine an initial metric for each child node of the set of expanded child nodes. The decoder further comprises a modified metric calculation unit configured to calculate a modified metric for at least one of the expanded child nodes from the metric associated with the expanded child node and a weighting coefficient, the weighting coefficient being a function of the level of the node in the decoding tree, the decoder assigning the modified metric to the at least one of the expanded child nodes.

In one embodiment, the metric determination unit may be configured to determine the initial metric as a function of the Euclidean distance between a part of the signal received and the path between the root node of the decoding tree and the node.

In certain embodiments, the weighting coefficient for a given level i is a function of the $i^{th}$ diagonal entry ($R_{ii}$) of the upper triangular matrix (R) obtained from a QR decomposition of the channel matrix representing the transmission channel, Q designating an orthogonal matrix.

The weighting coefficient may be a function of the inverse of the $i^{th}$ diagonal entry ($R_{ii}$) of the upper triangular matrix (R) obtained from the QR decomposition of the equivalent channel matrix.

In addition, the weighting coefficient may further depend on the signal-to-noise ratio.

In certain embodiments, the modified metric calculation unit may be configured to reduce the initial metric by the weighting coefficient.

The modified metric calculation unit may be configured to calculate a modified metric for each expanded child node.

Alternatively, the modified metric calculation unit may be configured to calculate a modified metric for each node of the selected set of expanded child nodes.

In one embodiment, the metric determination unit may be configured to assign the initial metric to each expanded node, and the modified metric calculation unit may be configured to calculate a modified metric for each node stored in the stack, in response to the detection of a stack reordering condition, the decoder being further configured to reorder the stack by increasing values of the modified metrics associated with the nodes of the stack.

In another embodiment, the modified metric calculation unit may be configured to calculate a modified metric for each expanded child node in response to the triggering of a termination alarm.

There is further provided a receiver configured to receive and decode a data signal, wherein the receiver comprises a decoder, according to any of the preceding features, configured to decode the data signal.

The invention also provides a mobile device configured to transmit and receive a data signal in a wireless communication network, the mobile device comprising such receiver configured to receive and decode the data signal.

There is further provided a method of sequentially decoding a data signal received through a transmission channel in a communication system, the data signal carrying transmitted symbols, the method comprising determining estimated symbols representative of the transmitted symbols carried by the data signal from information stored in a stack, the stack being filled by iteratively expanding child nodes of a selected node of a decoding tree, the decoding tree comprising a plurality of nodes. Each node of the decoding tree corresponds to a candidate component of a symbol of the data signal and each node being assigned a metric. The stack is filled at each iteration with a set of expanded child nodes and is ordered by increasing values of metrics associated with the nodes, the selected node for each iteration corresponding to the node being assigned the lowest metric in the stack. The method comprises determining an initial metric for each child node of the set of expanded child nodes. The method further comprises calculating a modified metric for at least one of the expanded child nodes from the initial metric associated with the expanded child node and a weighting coefficient, the weighting coefficient being a function of the level of the node in the decoding tree, the method comprising assigning the modified metric to the at least one of the expanded child nodes.

The invention also relates to a computer program product for decoding a data signal received through a transmission channel in a communication system by determining estimated symbols representative of the transmitted symbols carried by the data signal, the data signal carrying transmitted symbols, the computer program product comprising:

a non-transitory computer readable storage medium; and
      instructions stored on the non-transitory computer readable storage medium that, when executed by a processor, cause the processor to perform the above steps.

The various embodiments of the invention thus provide an improved weighting coefficient applicable to for spatial multiplexing schemes and general STBC MIMO schemes taking into account the levels in the tree. By developing the error probability under parameterized sequential decoders such as the Stack, Fano or SB-Stack decoders, an improved weighting coefficient may be determined as a function of at least some of the following parameters:

the Signal-to-Noise Ratio (SNR);
the channel gains;
the diagonal coefficients of the triangular matrix R obtained after the QR decomposition of the channel matrix, and/or
the levels of the tree.

This results in a tree-level dependent sequential decoding which optimizes flexibility in terms of performance/complexity.

Further advantages of the present invention will become clear to the skilled person upon examination of the drawings and detailed description. It is intended that any additional advantages be incorporated herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
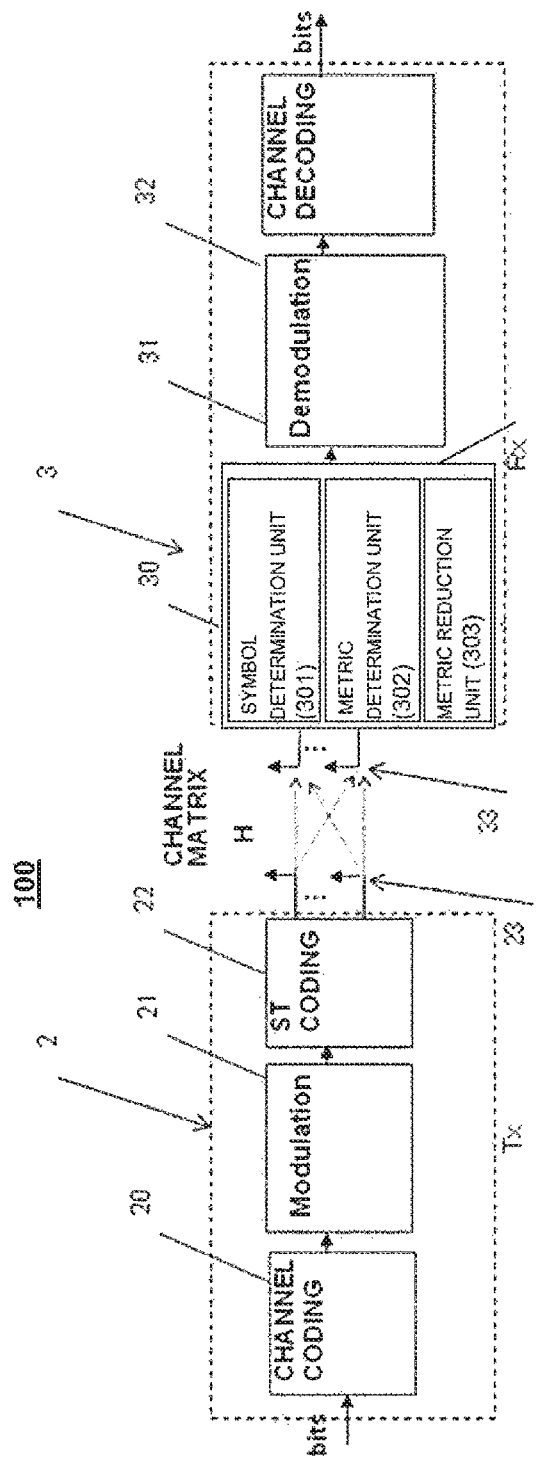
FIG. 1 schematically represents an exemplary communication system implementing the decoding method.

Embodiments of the invention provide methods and apparatuses for sequential decoding of a data signal received over a communication channel by searching candidate nodes in a decoding tree, according to the closest lattice point search problem, and filling in parallel an ordered list or stack of previously examined paths of different lengths. The following description will be made with reference to a "stack" for illustrative purpose although equivalent data structures may be used.

A sequential decoding algorithm is a tree-search based decoding algorithm which is based on a tree representation of the ML optimization problem (represented by the decoding tree) and on a tree search according to a Best-First strategy. Such sequential decoding algorithm uses the stack to store the best candidate lattice points.

Sequential decoding techniques take into account a metric determined for each expanded node of the decoding tree. Each node selected among the expanded nodes (component of a candidate lattice point) is stored in the stack in association with the computed metric. Such metric is conventionally determined as a function of the Euclidean distance between the received signal and the symbols vector represented by the path between the root node and the current node.

The decoding tree (also referred to as "search tree" or "logic tree") is a data structure representing the different values taken by the coordinates (components) of the constellation points that can belong for example to a $2^q$ QAM constellation. The decoding tree comprises a plurality of nodes representing possible components of a symbol of the received data signal (the received data signal may be represented according to a real-valued representation) and stores a selected set of the expanded nodes in a stack, each node being stored in the stack in association with the corresponding metric. The metric of a node may be defined, for the data signal being considered by a numerical value.

The stack thus comprises candidate nodes, each node being maintained in the stack along with its assigned metric. The decoding method recursively extends the top node in the stack until reaching a leaf node of the tree or meeting a termination condition.

According to certain embodiments of the invention, the metric of each node corresponding to a given level of the decoding tree may be determined by applying a weighting coefficient having a value depending on the level of the tree (referred to hereinafter as a "tree level dependent weighting coefficient") to optimize the flexibility in terms of performance/complexity.

In the following description, the term "node" or "node value" will be similarly used to designate a component of a symbol of the received data signal. The first node of the tree is referred to as the root node. A node that does not have any child node (a child node is also referred to as "successor") is referred to as a "leaf" node and corresponds to the lowest level in the tree. Each node has at most one parent node located above it in the tree. The root node being the highest node in the tree, it does not have any parent node. The depth (or dimension) of a given node designates the length of the path from this given node up to the root node of the decoding tree. All the nodes of the decoding tree can be reached from the root node. Each path from the root node to a leaf node thus represents a possible transmitted signal. Nodes in the decoding tree represent the different possible values of the symbols $s_i$, where $s_i$, with i representing an integer ranging from n to 1, represent the real and imaginary components of the transmitted information vector. A leaf node designates a node in depth n. According to the notations used herein, the child nodes of a node $s_k$ are designated by the components $s_{k-1}$ and a path of depth i in the tree is designated by the vector $s^{(i)}=(s_n, s_{n-1}, \ldots s_i)$ of length (n−i+1).

The present invention may be implemented in a wireless linear communication system. The communication system may comprise at least a transmitter for transmitting simultaneously a plurality of lattice points through a communication channel, and at least a receiver for receiving the lattice points transmitted by the transmitter in the form of independent signals. The number of lattice points received by the received may be at least equal to the number of lattice points sent by the transmitter to avoid rank deficiency.

The present invention may be implemented in a wireless communication system for detecting information data. The communication system comprises at least a transmitter for transmitting simultaneously a plurality of information symbols through a communication channel, and at least a receiver for receiving the symbols transmitted by the transmitter(s) in the form of independent signals. The communication channel may be any linear AWGN (Additive White Gaussian Noise) channel or a multipath channel using single carrier or multi-carrier modulation types such as OFDM (Orthogonal Frequency-Division Multiplexing).

An embodiment of the invention can be integrated in a receiver, for example for the decoding of data transmitted in a MIMO (Multiple Input Multiple Output) channel, according to any MIMO configuration, or for the detection of multiple users.

The wireless communication system may be alternatively a single-antenna multicarrier communication system using multicarrier communication techniques to combat frequency-selective channels and manage interference and delays such as OFDM modulations adopted in wireless standards like IEEE 802.11 (WiFi) and Filter Bank Multi-Carrier (FBMC) modulations.

In other applications of the invention, the communication system may be an optical receiver device implemented in optical fiber-based communication systems such as a Polarization Division Multiplexing-OFDM (PDM-OFDM) system used for example as a telecommunication medium in access networks, metropolitan networks, or in computer networks in order to generate, the optical communication channel output admitting a lattice representation.

In such embodiments, the information symbols conveyed by an optical transmitter device may be carried by optical signals polarized according to the different polarization states of the fiber. The optical signals may propagate along the fiber-based transmission channel according to one or more propagation modes until reaching the optical receiver device.

In some embodiments corresponding to optical communications, the optical signal carrying the information symbols may be generated using a single wavelength lasers.

In other embodiments, wavelength division multiplexing (WDM) techniques may be used at the optical transmitter devices to enable generating optical signals using a plurality of independent wavelengths.

In another application of the invention to optical communications using in particular multi-mode fibers, space division multiplexing techniques may be further used to multiplex the information symbols according to the various propagation modes.

Further, a multiple access technique such as WDMA (Wavelength Division Multiple Access) may be used in applications to optical communication systems.

When applied to MIMO decoding in a MIMO communication system, for a single user or multiple users detection, the dimension of the received signal or channel output depends on the dimension of the signal space at the transmitter, on the number ($n_t$) of the Transmit (Tx) antennas and/or on the number ($n_r$) of Receive (Rx) antennas.

The MIMO system may present a centralized configuration where the transmit antennas are collocated at a same user. Alternatively, the MIMO system may be a distributed MIMO system (or multi-user MIMO) where the transmit antennas are distributed in the communication network and are located at different users. Such multi-user MIMO configurations may be used for example in mobile networks in the uplink communications applied for example in cellular 3G, 4G and LTE standards or in cooperative communications applied for example in ad-hoc networks (wireless sensor networks, machine-to-machine communications, internet of things . . . ). In such multi-user configurations, the communication system may further use any multiple access technique such as Time Division Multiple Access (TDMA), Frequency Division Multiple Access (FDMA), Code Division Multiple Access (CDMA), and Space-Division Multiple Access (SDMA), or a combination of these techniques.

The wireless network environment may comprise a plurality of base stations (also referred to as "nodes" or "access points" or "cells" depending on the application context of the invention), each base station including a transmitter and a receiver including one or more antennas. Each station may communicate with other stations through a wireless connection.

Referring to FIG. 1, an exemplary wireless communication system 100 between a transmitter and a receiver in which a MIMO transmission is used, implementing an STBC (Space Time Block Code) code in transmission to distribute the symbols modulated over various degrees of freedom of the channel. Each transmitter 2 of a station may exchange data with a receiver 3 of another station according to the wireless communication system. The wireless network 100 may rely on a centralized architecture (a controller is provided to control the operation of the base stations) or a decentralized architecture (the base stations may communicate directly with one another). User Terminals (such as wireless devices, cellular phones, personal digital assistants, laptops, robots, Internet of Thing devices, etc.), may communicate with one or more base stations on the forward link or on the reverse links. The user terminals may be fixed or mobile.

The MIMO configuration may be symmetric, in which case it includes a same number ($n_t$) of Transmit antennas as the number ($n_r$) of Receive antennas. Alternatively, the MIMO configuration may be asymmetric, in which case the number ($n_t$) of Transmit antennas is different from the number ($n_e$) of Receive antennas (in particular the number $n_r$, at the receive side, is higher than $n_t$, at the transmit side to avoid a rank deficiency).

The transmitter 2 can transmit a signal to a receiver 3 by means of a noisy MIMO channel. The data transmitter 2 can in particular be integrated in the base stations. The transmitter 2 may comprise for example:
  a channel coder 20 for providing convolutional codes,
  a modulator 21 such as a QAM modulator for delivering symbols;
  a space/time coder 22 for delivering a code word;
  $n_t$ transmit antennas 23, each transmit antenna being associated with an OFDM modulator.

The transmitter 2 codes a binary signal received as input using a convolutional code provided by the channel coder 20. The signal is then modulated by the modulator 21 according to a modulation scheme (for example, a quadrature amplitude modulation $2^q$-QAM. The modulator 21 can also implement a modulation scheme generating complex symbols, each complex symbol belonging to a group of symbols $s_j$. The modulated symbols thus obtained are then coded by the space-time coder 22 to form an ST code word, such as the Golden Code ("The Golden Code: A 2×2 Full-Rate Space-Time Code with Non-Vanishing Determinants", J.-C. Belfiore, G. Rekaya, E. Viterbo, IEEE Transactions on Information Theory, vol. 51, no. 4, pages 1432-1436, April 2005). The STB code may be based on a complex matrix of dimension $n_t*T$, in which $n_t$ designates the number of transmission antennas and T is the time length of the STB code, or on a spatial multiplexing (the modulated symbols are directly sent to the transmission antennas).

The code word thus generated is converted from the time domain to the frequency domain and distributed over the $n_t$ transmission antennas. Each dedicated signal is then modulated by a respective OFDM modulator, and transmitted over the corresponding transmit antenna 23, optionally after filtering, frequency transposition and amplification.

The receiver 3 can be also integrated in the base stations. The receiver 3 may be configured to receive a signal y transmitted by the transmitter 2 in a wireless channel. The channel may be noisy (for example channel with Additive White Gaussian Noise (AWGN) subjected to fading). The signal transmitted by the transmitter 2 may be further affected by echoes due to the multiple paths and/or the Doppler effect due to the transmitter and receiver having a non-zero relative velocity.

In one exemplary embodiment, the receiver 3 may comprise:

- $n_r$ receive antennas 33 for receiving the signal y, each receive antenna being associated with a respective OFDM demodulator; the OFDM demodulators ($n_r$ demodulators) are configured to demodulate the received signal observed at each receiving antenna and delivering demodulated signals. A frequency/time converter may be used to perform a reverse operation of the time/frequency conversion implemented in transmission, and to deliver a signal in the frequency domain;
- a space/time decoder 30 configured to deliver a decoded signal;
- a demodulator 31 configured to perform a demodulation associated with a decoding.

The Space Time decoder 30 may be a sequential decoder configured to sequentially decode a data signal received through the transmission channel. The transmission channel is represented or modeled by a channel matrix H. The decoder 30 comprises a symbol estimation unit 301 configured to determine estimated symbols representative of the transmitted symbols carried by the received signal from information stored in a stack, the stack being filled by iteratively expanding child nodes of a selected node of the decoding tree. The stack is filled, at each iteration, with a set of expanded child nodes and is ordered by increasing values of metrics assigned to the nodes, the selected node for each iteration corresponding to the node having the lowest metric in the stack. The sequential decoder 30 further comprises a metric determination unit 302 for determining an initial metric for the set of expanded child nodes. The decoder 30 further comprises a modified metric calculation unit 303 configured to determine a tree level dependent weighting coefficient for a given node of the decoding tree, the tree level dependent weighting coefficient being a function of the level of said node in the decoding tree, and calculate a modified metric for at least one expanded child node from the metric associated with said least one expanded child node and the weighting coefficient. In one embodiment, the modified metric calculation unit 303 is configured to reduce the metric of a node by the tree level dependent weighting coefficient. The following description will be made with reference to a reduction of the metric using the tree level dependent weighting coefficient, for illustration only. The modified metric calculation unit 303 will be also referred to as a "metric reduction unit" 303 in the following description of certain embodiments.

The initial metric (also referred to simply as "initial metric" hereinafter) may be a function of the Euclidean distance between a part of the signal received and the path between the root node of the decoding tree and the node.

In one embodiment, the metric reduction unit 303 may be part of the metric determination unit 302 and may be used by the sequential decoder 30 to assign a reduced metric to each child node expanded during each iteration.

Alternatively, the metric reduction unit 303 may be used by the sequential decoder 30 to reduce the metric of each node stored in the stack and reorder the node by reduced metrics in response to the triggering of a stack reordering activation condition.

Still alternatively, the sequential decoder 30 may start the decoding by assigning non-reduced metric to each expanded child node, at each iteration of the decoding steps, until a termination alarm is triggered. The sequential decoder 30 then continues the decoding by computing a reduced metric for each expanded child node using the metric reduction unit 303 to enable early termination of the decoding.

It should be noted that the receiver 3 implements a reverse processing of the processing implemented in transmission. Accordingly, if a single-carrier modulation is implemented in transmission instead of a multi-carrier modulation, the $n_r$ OFDM demodulators are replaced by corresponding single-carrier demodulators.

The skilled person will readily understand that the various embodiments of the invention are not limited to specific applications. Exemplary applications of this new decoder include, with no limitation, multi-user communication systems, MIMO decoding in configurations implementable in wireless standards such as the WFi (IEEE 802.11n), the cellular WiMax (IEEE 802.16e), the cooperative WiMax (IEEE 802.16j), the Long Term Evolution (LTE), the LTE-advanced, the 5G ongoing standardization, and optical communications.

In one application of the invention to a multi-antenna system to decode a signal received by the multi-antenna system (MIMO), with $n_t$ transmit and $n_r$ receive antennas using spatial multiplexing, the data signal $y_c$ received as a complex-valued vector is equal to:

$$y_c = H_c s_c + w_c \tag{1}$$

In Equation (1), $H_c$, $s_c$, and $w_c$ designate respectively the complex value of the channel matrix H, the vector s representing the transmitted data signal and the noise vector w. The received signal $y_c$ may be then transformed into a real-valued representation, for example according to equation (2):

$$y = \begin{bmatrix} \mathcal{R}(H_c) & -\mathcal{J}(H_c) \\ \mathcal{J}(H_c) & \mathcal{R}(H_c) \end{bmatrix} \begin{bmatrix} \mathcal{R}(s_c) \\ \mathcal{J}(s_c) \end{bmatrix} + \begin{bmatrix} \mathcal{R}(w_c) \\ \mathcal{J}(w_c) \end{bmatrix} \tag{2}$$

In equation (2), $\mathcal{R}(.)$ and $\mathcal{J}(.)$ denote respectively the real and imaginary parts of a complex-valued vector.

The equivalent channel output can then be written as:

$$y = Hs + w \tag{3}$$

In embodiments where a length-T Space-Time code is used, the channel output can be written in the same form of equation (1) with the equivalent channel matrix $H_{eq}$ given by:

$$H_{eq} = H_c \Phi \tag{4}$$

In equation (4), $\Phi \in \mathbb{C}^{n_t T \times n_t T}$ corresponds to the coding matrix of the underlying code. For ease of presentation and given that both uncoded and coded schemes result in a same real-valued lattice representation, the following description will be made with reference to the spatial multiplexing and symmetric case with $n_t = n_r$ and $n = 2n_t$.

According to the equivalent system obtained in (3), the received signal can be viewed as a point of the lattice generated by H and perturbed by the noise vector w.

When perfect detection (also referred to as 'perfect decoding') is possible, the receiver implements an ML decoder (also referred to as 'ML detector') that attempts to determine, given the channel output and the channel matrix, an estimate ŝ of the originally transmitted symbols vector from the given data in H and y, according to the minimization of the error probability such that:

$$\hat{s} = \text{argmin}_{s \in \mathcal{A}} Pr(\hat{s} \neq s) \quad (5)$$

In Equation 5, the finite subset $\mathcal{A}$ represents the alphabet to which belong the real and imaginary parts of the complex transmitted symbols vector $s_c$ information symbols. The minimization of the error probability under ML detection is equivalent to the minimization problem given by:

$$\hat{s} = \text{argmin}_{s \in \mathcal{A}} \|y - Hs\|^2 \quad (6)$$

Assuming coherent systems where H is perfectly known (or perfectly estimated using estimation techniques such as least square estimators) at the receiver, optimal ML detection may be solved for the closest vector in the n-dimensional lattice generated by H according to the minimization problem of Equation 6.

Thus the ML detector chooses the symbols vector ŝ which yields the smallest Euclidean distance between the received real-valued vector y, and the lattice points corresponding to the vectors Hs for $s \in \mathcal{A}$. The ML detector represents a discrete optimization problem over candidate vectors s within the chosen alphabet. In the case of high constellation orders and high dimension of the system (number of antennas), the search for the ML solution in an exhaustive way generally requires a very high complexity.

Sequential decoders implementing a tree search strategy searches the closest lattice point to the received vector using a decoding tree structure. Before transmission of the signal to such a sequential decoder, a predecoding may be performed using a QR decomposition of the channel matrix such that H=QR where Q designates the orthogonal matrix and R designates the upper triangular matrix. Given the orthogonality of Q, equation (3) can be rewritten in the following form:

$$\tilde{y} = Q^t y = Rs + Q^t w \quad (7),$$

The ML decoding problem then amounts to solving the equivalent system given by:

$$\hat{s} = \text{argmin}_{s \in \mathcal{A}} \|\tilde{y} - Rs\|^2 \quad (8),$$

The triangular structure of R thus reduces the search of the closest point to a sequential tree-search. Nodes in the tree represent the different possible values of the symbols $s_i$. The symbols $s_i$ for i=1, ..., n represent the real and imaginary components of the transmitted information vector $s_c$. A tree branch represents two consecutive nodes $(s_{i+1}, s_i)$.

Figure 2:
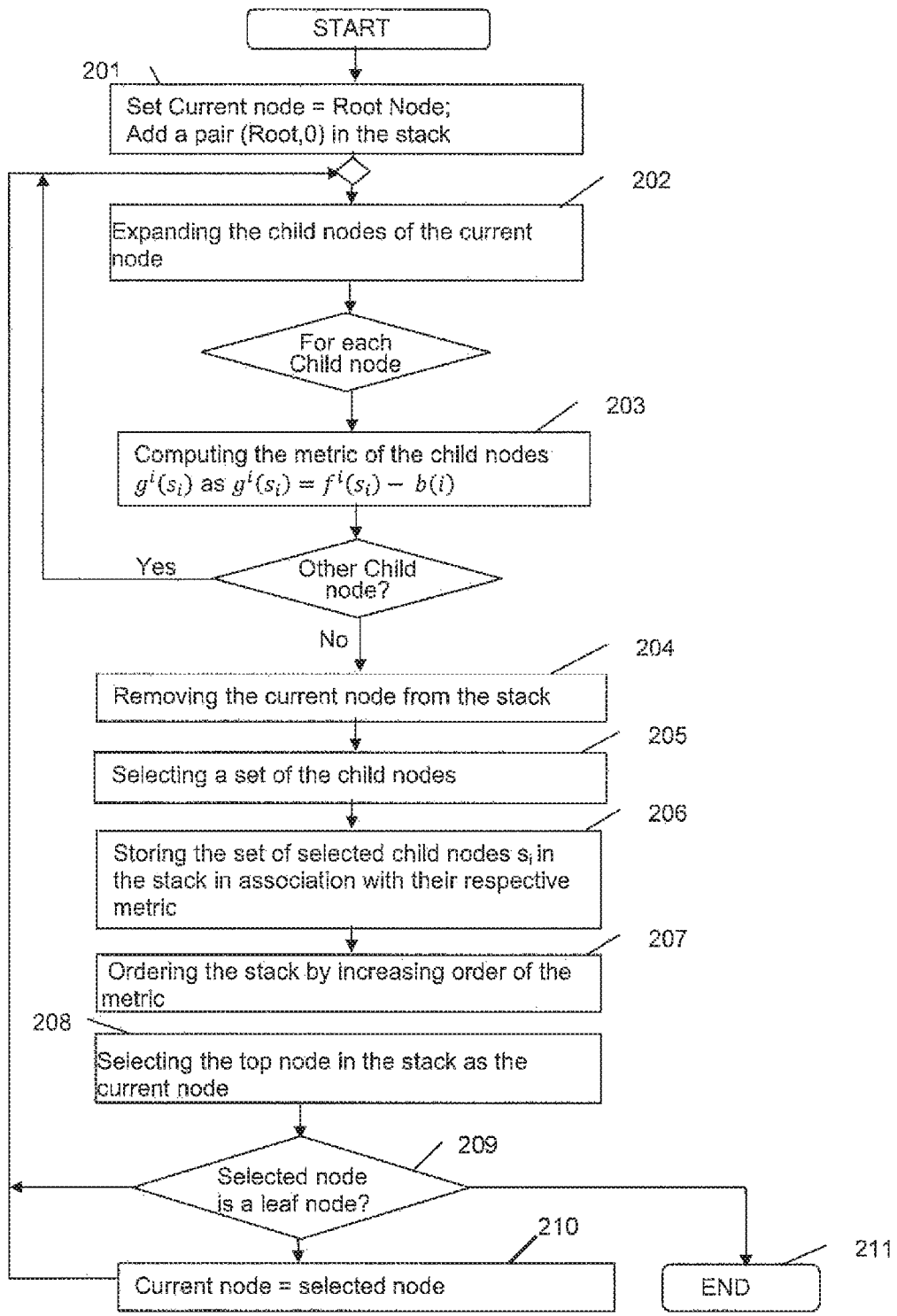
FIG. 2 is a flowchart depicting a sequential decoding method according to certain embodiments.

Referring now to FIG. 2, a flowchart is presented that depicts a sequential decoding method which may be executed by the receiver 3 according to certain embodiments. A sequential decoding method uses a sequential decoding tree for decoding a received data signal, corresponding to a transmitted data signal transported by a transmission channel associated with a channel matrix H.

The search tree (also referred to as "the decoding tree" hereinafter) may be generated through a QR decomposition of the channel matrix H (H=QR) in a pre-decoding phase as described above, where $Q^t$ represents an orthogonal matrix and R represents the generator matrix (also referred to as the "equivalent channel matrix") in the decoding equivalent system, and through a multiplication of the received signal by $Q^t$. Given the upper triangular structure of the matrix R, the ML optimization problem is solved by performing a tree-search based on the generation of the decoding tree. An empty stack or list may be also initialized.

In step 201, the root node is selected as the current node and a pair (Root, 0) is added to the stack at the top position.

In step 202, the child nodes (or descendent nodes) of the root node representing all the possibilities of the first symbol $x_1$ are generated.

In step 203, the metric of the child node $g^i(s_i)$ is calculated as $g^i(s_i) = f^i(s_i) - b(i)$ where:
  $f^i(s_i)$ represents the elementary node metric which may be determined from the Euclidean distance $f^i(s_i)$ between the signals received and the path between the root node and the node considered; and
  a weighting coefficient b(i) determined as a function of the level i of the tree corresponding to the level of the current node.

The weighting coefficient b(i) may further take into account the SNR value and the channel fadings.

It has been demonstrated that the tree level dependent weighting coefficient b(i) is such that a high weighting coefficient value can be applied to the elementary node metrics $f^i(s_i)$ of the most advanced nodes in the tree.

In the decoding tree, there exists a single path between the root node and the child node being considered. From this path, it is thus possible to determine the corresponding decoded bits or an estimation of the transmitted information sequence transmitted between the root node and the child node considered.

Step 203 is then iterated for each child node generated in step 202 (block 207).

When all the child nodes have been processed, in step 204, the node positioned at the top of the stack is removed from the stack. In the first iteration of the decoding steps, the top node is the root node.

In step 206, all the child nodes or a set of the child nodes are inserted in the stack. Each child node $s_i$ is added in the stack together with its respective metric $g^i(s_i)$ determined in step 203. Additional data may be further inserted in the stack in association with each child node such as the path and/or the level of the child node in the tree.

In step 207, the nodes in the stack are sorted according to a decreasing order of the metrics associated with nodes.

In step 208, the top node of the stack $s_{top}$ is selected as the current node in order to generate its child nodes.

In step 209, it is determined if the selected node is a leaf node. If the selected node is a leaf node (i.e. having no child node), the decoding method is terminated in step 211. The decoder may then return an estimate of the symbols vector.

Otherwise, in step 210, the selected node is set as the current node and steps 201 to 210 may be repeated for the newly selected node (which represents the node having the lowest metric in the stack) to generate the child nodes, at a next level j of the decoding tree with j being comprised between n−1 to 1. The next processed level j depends on the top node selected in the stack.

Each iteration of steps 201 to 210 (corresponding to the processing of a current node) thus provides a path between the root node and a new leaf node stored in the stack.

The received signal may be estimated from the node information stored in the stack, and in particular the path(s) stored in the stack when such information is available. For example, if a symbol estimation (hard decision) is applied, the construction of the tree implements a single iteration of steps 201 to 210 enabling a single path to be determined corresponding to a hard estimation of the transmitted data signal. Alternatively, if a probabilistic estimation (soft decision) may be applied, the decoding method may deliver soft-output information in the form of Log-Likelihood Ratio (LLR) values. In this case, several iterations of steps 201 to 210 may be performed. Each iteration provides a different path from the root node to leaf nodes (representing a candidate lattice point). These different paths (representing candidate lattice points) may then be stored in an auxiliary stack together with their paths. A probabilistic estimation of the information signal can be determined based on these paths.

The elementary node metric $f^i(s_i)$ associated with a child node ($s_i$) computed in step 204 or 205 is determined from the metrics of the nodes in the tree comprised in the path from the root node $s_n$ to the current node $s_i$.

The triangular structure of matrix R reduces the search of the closest point to a sequential tree-search. Nodes in the tree represent the different possible values of the symbols $s_i$, where $s_i$ for i=1, ..., n represent the real and imaginary components of the information vector $s_c$. A tree branch may represents two consecutive nodes ($s_{i+1}$; $s_i$).

Specifically, the metric $w_j(s_j)$ of a node at a level j of the tree can be determined as the Euclidean distance between the $j^{th}$ component of the vector $\tilde{y}$ representing the received signal and the vector ($s_n$ ... $s_j$) comprising the node values of the tree from the root node $s_n$ to the node $s_j$ at level j according to equation (9):

$$f^j(s_j) = w_j(s_j) = |\tilde{y}_j - \Sigma_{k=j}^n R_{jk} s_k|^2 \qquad (9)$$

It should be noted that the cumulated metric $w(s_j)$ of a node $s_j$ represents the metric of the path $s^{(j)}$ (sum of the metrics $w_j(s_j)$ of the nodes in the tree comprised in the path $s^{(j)}$ from the root node $s_n$ to the node $s_j$). It is therefore equal to the sum over all metrics for different nodes forming the path according to: $w(s_j) = \Sigma_{k=j}^n w_k(s_k)$. Using this definition, the ML metric minimization of equation (8) is equivalent to search for the path in the tree having the least cumulated metric.

The metric of equation (9) represents a metric for the branch ($s_{j+1}$; $s_j$). Due to the triangular structure of matrix R, the search for candidate lattice points is started from the component $s_n$.

Accordingly, the node metric according to certain embodiments may be determined as:

$$g^j(s_1) = |\tilde{y}_j - \Sigma_{k=j}^n R_{jk} s_k|^2 - b(j) \qquad (10)$$

In one embodiment, the tree-level dependent weighting coefficient b(i) may be determined in step 203 as a function of the $R_{ii}$ components and in particular from the $i^{th}$ diagonal entry of the upper triangular matrix R obtained from the QR decomposition of the equivalent channel matrix H_eq, such as a function of the norm $\|R_{ii}\|$ of the components.

In one embodiment, the tree-level dependent weighting coefficient b(i) may be determined in step 203 as a function of the inverse $$\frac{1}{R_{ii}}$$

of $i^{th}$ diagonal entry $R_{ii}$ of the upper triangular matrix R obtained from the QR decomposition of the equivalent channel matrix.

In particular, the tree-level dependent weighting coefficient b(i) may be determined in step 203 as a function of the ratio $$\frac{b_{adapt}}{R_{ii}},$$

where $R_{ii}$ designates the $i^{th}$ diagonal entry $R_{ii}$ of the upper triangular matrix R obtained from the QR decomposition of the equivalent channel matrix, and $b_{adapt}$ designates a predefined adaptive weighting coefficient value. The adaptive weighting coefficient value $b_{adapt}$ may be determined arbitrarily or depending on the channel variance $\sigma^2$ as described in "Lattice Sequential Decoder for Coded MIMO Channel: Performance and Complexity Analysis". W. Abediseid and Mohamed Oussama Damen. CoRR abs/1101.0339 (2011):

$$b = \sigma^2 \log\left(\frac{4}{\pi \sigma^2}\right) \qquad (11)$$

This allows favoring the nodes which are located at levels leading to promising nodes. Indeed, the diagonal element $R_{ii}$ of the upper triangular matrix R corresponding to a level i in the tree characterizes the channel quality. In order to faster the convergence of the algorithm, nodes located at levels with high values of channel fading $R_{ii}$ may be favored by allocating to them a small weighting coefficient value that can be determined for example as a quantity depending on the ratio $$\frac{1}{R_{ii}}.$$

The invention may be also applied to compute the metric of a node in an SB-stack decoder. The SB-stack decoder uses a tree representation of the ML problem, each path from the root node to a leaf node being a possible transmitted signal: starting from the root node (from the highest dimension of the tree in a descending order), all or a subset of the child nodes $s_n$ are explored, and for each explored node a metric associated with the node is computed. Only the nodes having a value that satisfies a sphere constraint according to the following inequality (12) are generated and may be stored in a stack:

$$\|\tilde{y} - Rs\|^2 \le C^2 \qquad (12)$$

Using the triangular structure of the ML decoding problem according to inequality (12), the SB-stack decoder determines a set of lattice points inside a sphere $S(y,C)$ centered at a point y representing the received signal y and having a radius C.

The inequality $\|\tilde{y} - Rs\|^2 \le C^2$ can be rewritten as:

$$\|R\xi\|^2 \le C^2 \qquad (13)$$

In inequality (13), R is a n×n matrix and is an n-dimensional vector.

The minimization problem (ML solution) $\min_{s \in A} \|\tilde{y} - Rs\|^2 \le C^2$ can thus be rewritten:

$$\min_{s \in A} \|R\xi\|^2 \le C^2 \qquad (14)$$

To limit the search region to the sphere of initial radius C, a search interval $I_i = [b_{inf,i}; b_{sup,i}]$ is defined for each detected component $s_i$, the lower boundary $b_{inf,i}$ and the upper boundary $b_{sup,i}$ of the search interval $I_i$ being determined from the initial radius C.

This involves that only the nodes having a value that is comprised in an interval $I_i=[b_{inf,i}; b_{sup,i}]$ are visited and can be stored in the stack. The search interval $I_i$ for each detected symbol $s_i$ is such that $b_{inf,i} \le s_i \le b_{sup,i}$. The lower boundary $b_{inf,i}$ and the upper boundary $b_{sup,i}$ of the search interval $I_i$ may be defined as follows:

$$b_{inf,i} = \left\lceil -\sqrt{\frac{T_i}{p_{ii}}} + S_i \right\rceil \quad (15)$$

$$b_{sup,i} = \left\lfloor \sqrt{\frac{T_i}{p_{ii}}} + S_i \right\rfloor \quad (16)$$

Where:

$$p_{ii} = R_{ii}^2 \text{ with } i = 1, \ldots, n \quad (17)$$

$$p_{ij} = \frac{R_{ij}}{R_{ii}} \text{ with } j = i+1, \ldots, n \quad (18)$$

$$S_i = \rho_i + \sum_{j=i+1}^{n} p_{ij} \xi_j \quad (19)$$

$$T_i = C^2 - \sum_{l=i+1}^{n} p_{ll}\left(\xi_l + \sum_{j=l+1}^{n} p_{lj}\xi_j\right)^2 = T_{i-1} - p_{ii}(S_i - s_i) \quad (20)$$

The number of visited nodes during the decoding process depends then on the interval $I_i$ for each symbol $s_i$, the boundaries of the search interval depending on the initial sphere radius C.

An interval is thus determined for each node $s_1$ representing a component of a symbol of the signal to be decoded. The search is continued until finding a leaf node and the optimal path $s^{(1)}=(s_n, s_{n-1}, \ldots, s_1)$ is returned (closest vector to the received signal vector according to ML criterion), without any update of the radius. A likelihood probability may be further assigned to the bits of at least one symbol of the data signal, taking into account the stored paths and a probabilistic estimation of the data signal (single-carrier and multi-carrier) may be determined taking into account the path(s) stored in the second stack and likelihood probabilities to determine the optimal path.

Figure 3:
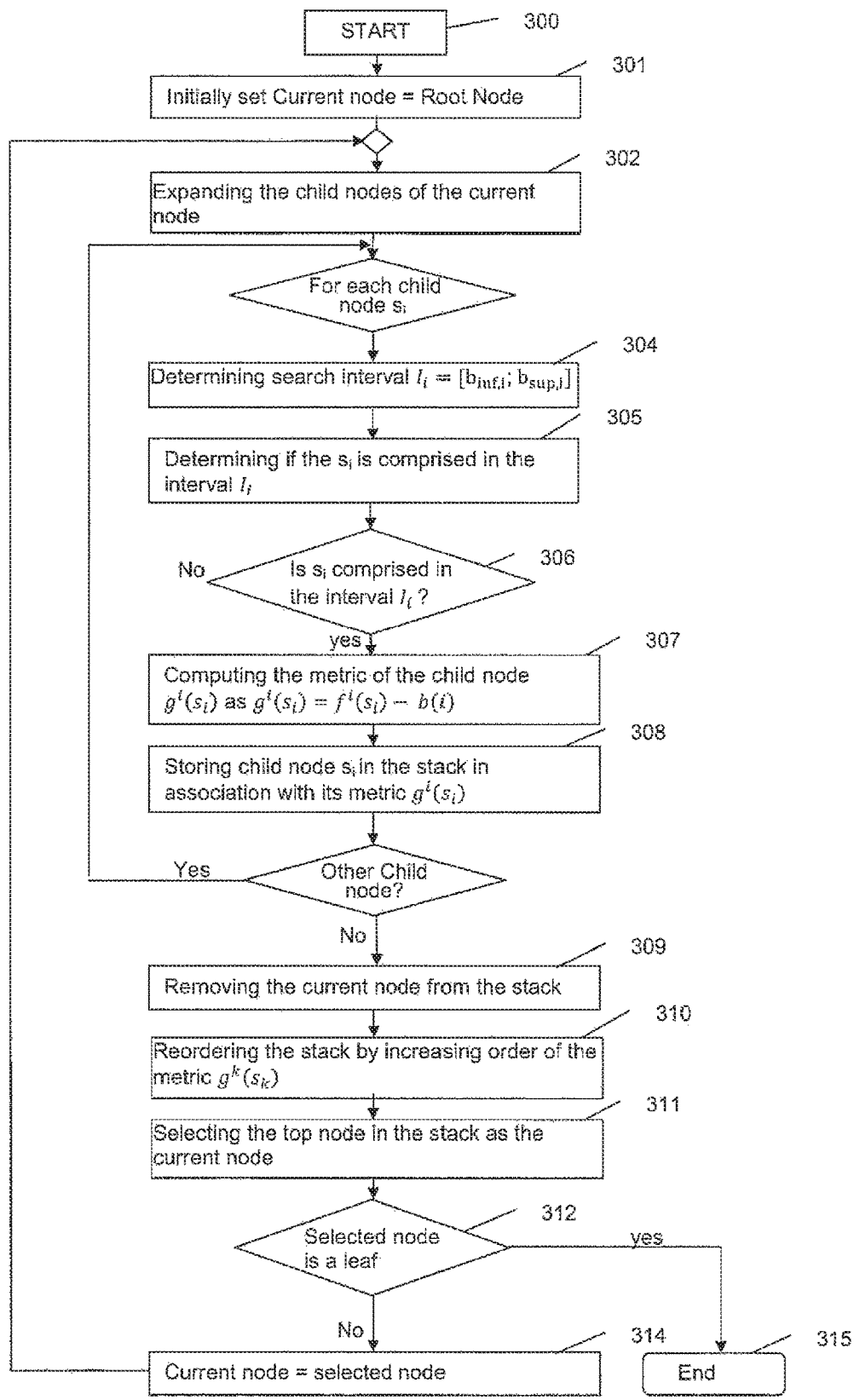
FIG. 3 is a flowchart depicting a stack decoding method according to certain embodiments.

Referring to FIG. 3, a flowchart depicting the SB stack decoding method according to certain embodiments is shown.

The method may comprise with a pre-decoding step including at least some of the following steps:
  performing a preprocessing on the channel matrix using for example a lattice reduction technique to improve the orthogonality of the column vectors of said matrix or/and using an MMSE-GDFE filtering to enhance the conditioning of the channel matrix,
  performing a QR decomposition of the channel matrix such that H=QR where Q designates the orthogonal matrix and R designates an upper triangular matrix,
  calculating the equivalent system to provide a triangular lattice representation of the lattice generated by H or equivalently by R.

This allows making a tree search to find the point in the tree solution of the minimization problem given by inequality (13): $\min_{s \in A}\|R\xi\|^2 \le C_{prop}^2$ (21), with $\xi = \rho - s$.

Once a signal to be decoded has been received, the decoder may implement at least one iteration of the following steps 301 to 311, for a current node of the tree stored in the stack.

The method initially starts with the root node as the current node. The first current node is therefore the root node (step 301).

The method initially starts by processing the root node as the current node (step 301). Steps 302 to 310 are iterated for each current node selected from the top of the stack to generate the child nodes for which the current node is the parent node. Each iteration is thus associated with a level i of the decoding tree (i=n to 1). The parameter i may be decremented for each new iteration depending on the top node that selected in the stack.

The first iteration of the decoding tree method is implemented to determine the child nodes of the root node at a first level i=n.

The subsequent iterations of the decoding tree method may be implemented to determine the child nodes of a current node corresponding to the top node selected in the stack (and to a given level or layer i of the decoding tree).

Each node of the tree may be associated with a metric, a path and/or a dimension (or depth). The dimension of a node corresponds to the level of the node in the tree considering the root node as a reference node.

According to the invention, the metric of a node $G^i(s_i)$ may be determined from a function of the Euclidean distance $f^i(s_i)$ between the signals received and the path between the root node and the node considered and for at least some of the nodes:
  from the function $f^i(s_i)$ of the Euclidean distance between the signals received and the path between the root node and the node considered;
  from the tree level dependent weighting coefficient b(i).

In the decoding tree, there exists a single path between the root node and a node being considered. From this path, it is thus possible to determine the corresponding decoded bits or an estimation of the transmitted information sequence transmitted between the root node and the node considered.

Specifically, for the current node being processed, all or a preselected subset of child nodes are determined by projecting ft on the i-th layer of the matrix R resulting from the QR decomposition, and for each child node (step 302), a constraint defining a condition that is to be satisfied by the child node with respect to the search interval $I_i$.

The search interval $I_i=[b_{inf,i}; b_{sup,i}]$ for the level i of the current node (corresponding to a component of the detected symbol) is determined in step 304 and comprises a lower bound $b_{inf,i}$ and an upper bound $b_{sup,i}$ determined from the initial radius according to equations (15) and (16). This interval thus limits the search region.

Specifically, in steps 305 and 306, it is determined if the considered child node of the current node has a value comprised within the interval $I_i$. If so, the metric of the node $g^i(s_i)=f^i(s_i)-b(i)$ is computed in step 307 and the child node is added in the stack, in step 308, together with its associated metrics. Additional data may be stored in the stack in association with each child node such as the path and/or the dimension of the child node. A child node may be thus taken into consideration only when its value lies in the search interval $I_i$. Accordingly, all child nodes or a subset of the child nodes having a value comprised in the interval $I_i$ will be stored in the stack. As a result, the paths scanned in the tree correspond to the points of the lattice located inside a sphere having a radius C. The initial radius C may be determined according to different approaches.

The decoding method may be applicable to decode finite or infinite lattices in $\mathbb{Z}^n$, the value of each node in the tree corresponding to the component of a symbol belonging to a constellation having a predefined range between a minimum threshold $C_{min}$ and a maximum threshold $C_{max}$). In embodiments where finite lattices are decoded (finite constellations), such as with QAM modulation, information symbols $s_i$ are carved from a finite alphabet and their real and imaginary parts, which correspond to the detected symbols over the tree, belong to the finite interval $I=[C_{min}, C_{max}]$. For example, in embodiments using a q-QAM modulation, the symbols $s_i$ belong to the interval $I_c=[\pm 1, \pm 2, \pm 3, \ldots \pm\sqrt{q}-1]$ and the nodes in the search tree corresponding to the used constellation symbols belong to the infinite set $I=[0, 1, 2, 3, \ldots, \sqrt{q}-1]$ where $C_{min}=0$ and $C_{max}=\sqrt{q}-1$.

In such embodiments, in order to guarantee that the estimated symbols belong to the considered constellation, in steps 305 and 306, the child nodes of the $i^{th}$ level may be alternatively selected within an interval $I'_i$ corresponding to the intersection between the constellation interval $[C_{min}, C_{max}]$ corresponding to the constellation and the intervals $I_i$:

$$I'_i=[\max(C_{min}, b_{inf_i}), (C_{max}, b_{sup_i})].$$

When all the child nodes of the current node have been processed, in step 309, the current node is deleted from the stack.

In step 310, the stack may be reordered by an increasing order of the metrics $g^k(s_k)$ so that the node $s_q$ in the stack having the lowest metric is stored in the top of the stack.

In step 311, the top node of the stack $s_q$ is selected as the current node in order to generate its child nodes.

In step 312, it is determined if the selected node is a leaf node. If the selected node is a leaf node (i.e. not having no child node), the method is terminated in step 315.

Otherwise, in step 314, the selected node is set as the current node and steps 302 to 315 may be repeated for the newly selected node (which represents the node having the lowest metric in the stack) to generate the child nodes, at a next level j of the decoding tree with j being comprised between n−1 to 1. The next processed level j depends on the top node selected in the stack.

Each iteration of steps 302 to 315 (corresponding to the processing of a current node) thus provides a path between the root node and a new leaf node stored in the stack.

When a leaf node is reached in the first iteration, the algorithm may terminate the processing or perform new iterations of steps 302 to 315. The closest vector to the vector representing the received signal may be estimated in step 315 by taking into account the node information stored in the stack, and in particular the path(s) stored in the stack when such information is available. For example, if a binary estimation (hard decision) is applied, the construction of the tree implements a single iteration of steps 302 to 315 enabling a single path to be determined corresponding to a hard estimation of the transmitted data signal. Alternatively, if a probabilistic estimation (soft decision) is applied, the decoding method may deliver soft-output information in the form of Log-Likelihood Ratio (LLR) values. In this case, several iterations of steps 302 to 315 may be performed. Each iteration provides a different path from the root node to leaf nodes (representing candidate lattice point). These different paths (representing candidate lattice points) may then be stored in an auxiliary stack together with their paths.

Figure 4:
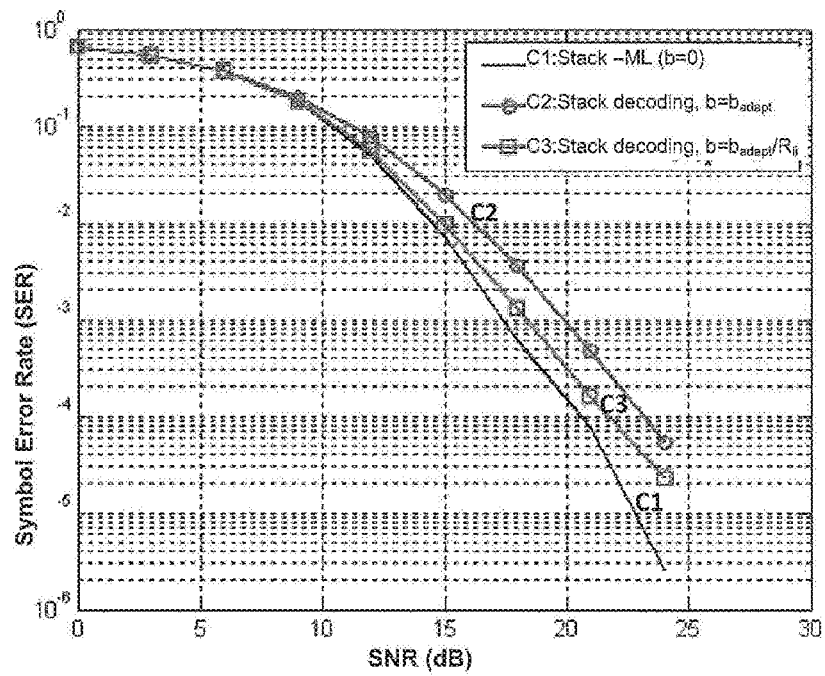
FIG. 4 is a diagram illustrating the Performance for spatial-multiplexing MIMO obtained with a decoder according to certain embodiments, in a 4×4 MIMO communication system using 16-QAM modulations without permutation.

FIG. 4 shows a diagram illustrating the performance for spatial-multiplexing MIMO obtained with a stack decoder according to certain embodiments, in a 4×4 MIMO communication system using 16-QAM modulations without permutation.

Figure 5:
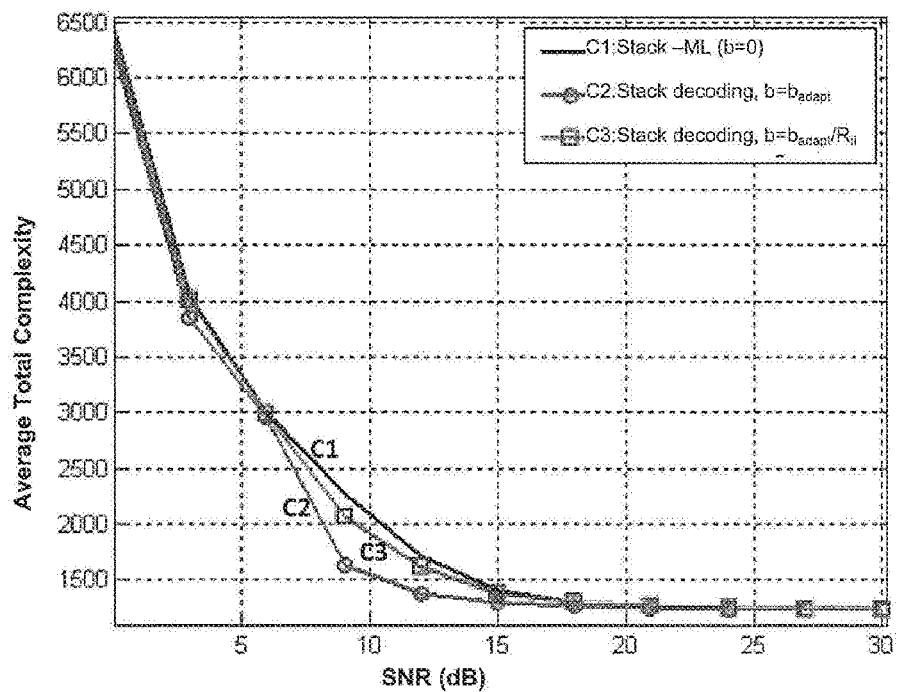
FIG. 5 is a diagram illustrating the Performance for spatial-multiplexing MIMO obtained with a decoder according to certain embodiments, in a 4×4 MIMO communication system using 16-QAM modulations, with a same intra-block permutation.

FIGS. 4 and 5 specifically illustrate comparative performance in terms of the bit error rate and average total complexity respectively obtained in an exemplary MIMO spatial multiplexed system using 4 transmit antennas and 4 receive antennas ($n_t=n_r=4$) and 16-QAM constellations according to the following parameters:

The curve C1 represents the performance of the stack decoder in terms of bit error rate in FIG. 4 and average total complexity in FIG. 5 using a fixed bias value b equal to 0 (corresponding to ML decoding), according to the prior art;

The curve C2 represents the performance of the stack decoder in terms of bit error rate in FIG. 4 and average total complexity in FIG. 5 using a fixed bias value equal to $b_{adapt}$;

The curve C3 represents the performance of the stack decoder in terms of bit error rate in FIG. 4 and average total complexity in FIG. 5 using the tree-level dependent weighting coefficient b(i) according to certain embodiments of the invention.

Numerical results show that the decoding method based on a tree-level dependent weighting coefficient b(i) to determine the metric of a node offers a BER gain of 2 dB over the prior art approach based on the fixed bias value $b_{adapt}$ which provides a BER equal to $10^{-4}$ while requiring in average almost the same computational complexity.

Even if the invention has particular advantages for computing the metric of an expanding child node in step 203, the metric reduction using the tree level dependent parameter b(i) may be alternatively applied only to the nodes stored in the stack for reordering the stack, while computing the metric conventionally in step 203 from the function $f^i(s_i)$ as disclosed in EP 15305910 (filed on Jun. 12, 2015).

In still another application, the metric reduction using the tree level dependent parameter b(i) may be applied in response to the detection of a triggering alarm to trigger early termination, while also computing the metric conventionally in step 303 from the function $f^i(s_i)$ as disclosed in EP15305907 (filed on Jun. 12, 2015).

Figure 6:
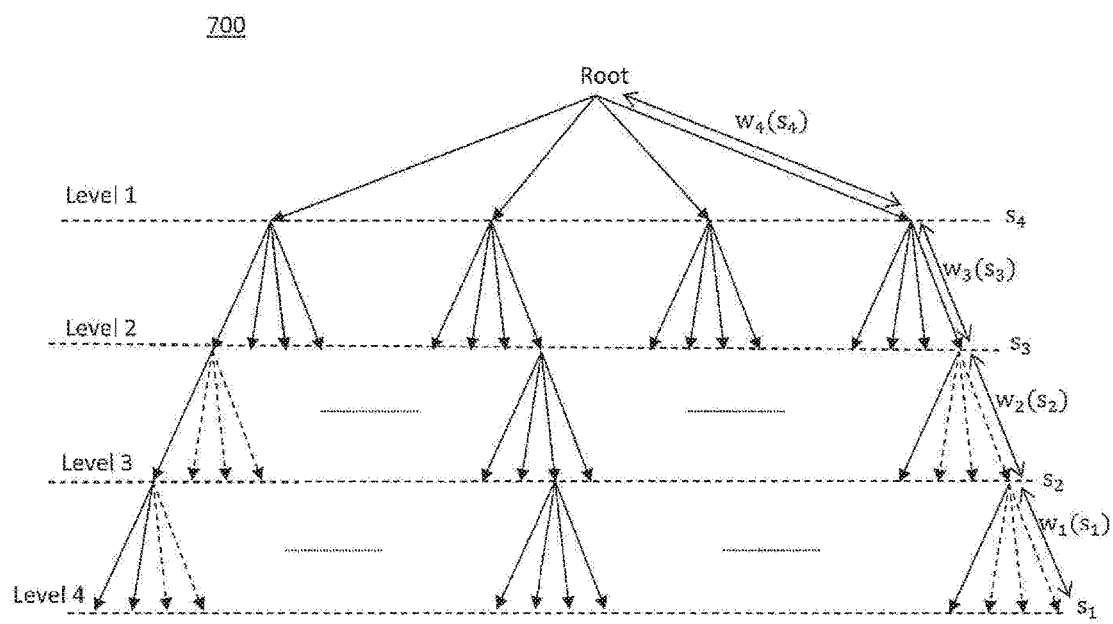
FIG. 6 shows an exemplary tree representation of the ML optimization problem.

FIG. 6 shows an exemplary tree representation of ML decoding problem for a 16-QAM constellation. In a 16-QAM constellation, the real and imaginary parts of the complex information symbols belong to the set of values $\{-3, 1, 1, 3\}$. The decoding method starts a tree-search process from the root node and proceeds along the branches (represented by an arrow) by iteratively expanding child nodes of the top node in the stack. The nodes are represented by the extremities of the arrows used to depict the branches. The decoding tree 700 comprises 4 levels (level 1, level 2, level 3 and level 4) and each level corresponding to the different values taken by the real symbols (level 1 corresponds to $s_4$, level 2 corresponds to $s_3$, level 3 corresponds to $s_2$, and level 4 corresponds to $s_1$).

FIG. 6 shows the metric associated with each path ($w_4(s_4)$ associated with $s_4$, $w_3(s_3)$ associated with $s_3$, $w_2(s_2)$ associated with $s_2$, and $w_1(s_1)$ associated with $s_1$). The metric associated with each path may be either the Euclidean metric or the modified metric computed from the tree-level based weighting coefficients.

Figure 7:
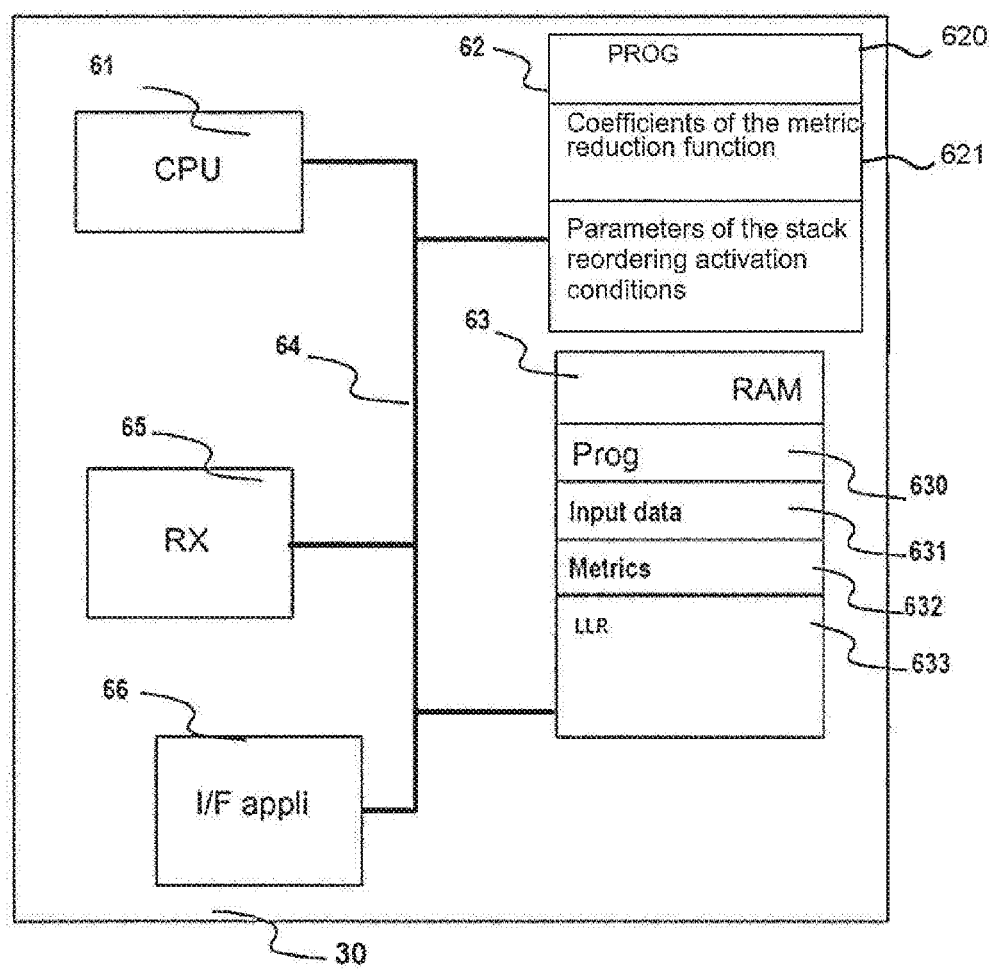
FIG. 7 schematically shows an exemplary hardware architecture of the decoder according to certain embodiments.

FIG. 7 represents an exemplary architecture of a space/time decoder 30 of the receiver 3 in a SB-stack embodiment of the invention. As shown, the space/time decoder 30 may include the following elements, which are linked together by a data and address bus 64:

a microprocessor 61 (or CPU), which is, for example, a digital signal processor (DSP);

a non-volatile memory 62 (or ROM, read-only memory);

a random access memory RAM 63;

an interface 65 for receiving input signals coming from the time/frequency converter;

an interface 66 for transmitting decoded data to the demodulator 31.

The non-volatile ROM memory 62 may include for example:

a register "Prog" 620;

coefficients 621 of the tree-level dependent weighting coefficient function b(i);

The non-volatile ROM memory 62 may comprise other predefined parameters used by the decoder such as $C_{min}$ and $C_{max}$ in embodiments where finite lattices are decoded (not represented).

The algorithms for implementing the method according to this embodiment of the invention can be stored in the program 620. The CPU processor 41 may be configured to download the program 620 to the RAM memory and runs the corresponding instructions. Specifically, the CPU comprises instructions that, when executed by a processor, cause the CPU to determine the estimated symbols representative of the transmitted symbols from information stored in the stack, the stack being filled by iteratively expanding child nodes of a selected node of a decoding tree, the decoding tree comprising a plurality of nodes, each node of the decoding tree corresponding to a candidate component of a symbol of the received data signal and each node being assigned a metric, the stack being filled at each iteration with a set of expanded child nodes and being ordered by increasing values of the metrics associated with the nodes. The selected node, for each iteration, corresponds to the node having the lowest metric in the stack. The CPU is caused to determine an initial metric for each child node of the set of expanded child nodes. The CPU is further caused to calculate the modified metric for at least one of the expanded child nodes from the initial metric associated with the expanded child node and the weighting coefficients (function of the level of the node in the decoding tree). The CPU is further caused to assign the modified metric to the at least one of the expanded child nodes.

The RAM memory 63 may include:

in a register Prog 630, the program run by the microprocessor 61 and downloaded in an active mode of the space/time decoder 30;

input data in a register 631;

data related to the nodes in a register 632;

likelihood probabilities or LLR in a register 634;

The data stored in the register 632 may include, for a node of the decoding tree, the metric parameters associated with this node (path from the root to said node, and/or the depth in the tree) as determined according to the various embodiments of the invention.

More generally, the decoding techniques described herein may be implemented by various means. For example, these techniques may be implemented in hardware, software, or a combination thereof. For a hardware implementation, the processing elements of decoder can be implemented for example according to a hardware-only configuration (for example, in one or more FPGA, ASIC or VLSI integrated circuits with the corresponding memory) or according to a configuration using both VLSI and DSP.

While the invention has been described in relation with a wireless communication system, it should be noted that the invention is not limited to such applications. For example, the decoding device and method may be integrated in a signal processing apparatus, for example electronic filters of finite impulse response (FIR) used in audio applications such as audio crossovers and audio mastering, to decode an output sequence from a given input sequence. Given an input sequence of data, the output sequence of a FIR filter of order M is a weighted sum of the recent input values observed in a sliding window of size M. Given the lattice representation in the model of the output sequence, certain embodiments of the invention may be accordingly integrated to generate an estimate of the input sequence.

In another application, methods, devices and computer program products according to some embodiments of the invention may be implemented:

in a Global Navigation Satellite System (GNSS), such as IRNSS, Beidou, GLONASS, Galileo, or in a GPS comprising one or more GPS receivers for estimating positioning parameters using for example carrier phase measurements.

Further, methods, devices and computer program products according to some embodiments of the invention may be implemented in cryptographic systems for determining estimates on private secret values used in a cryptographic algorithm for encrypting/decrypting data or messages during their storage, processing or communication. In lattice-based cryptography applications, data/messages are encrypted in the form of lattice points. The decryption of such encrypted data may be advantageously performed according to some embodiments of the invention, enabling for a high probability of success recovery of secret values with a reduced complexity.

While embodiments of the invention have been illustrated by a description of various examples, and while these embodiments have been described in considerable detail, it is not the intent of the applicant to restrict or in any way limit the scope of the appended claims to such detail. Particularly, the invention is not limited to a particular type of sequential decoder. More generally the invention may apply to any sequential decoder using a best-first tree-search to search for candidate lattice vectors such as Stack decoders, Fano decoders, decoders implementing the M-algorithm, the SB-Stack and the Zigzag Stack decoder as described in patent application EP No 14306517.5. The zigzag decoder uses a stack, similarly to the SB-stack decoder, but instead of generating all child nodes or searching the candidate lattice points in a search interval, the zigzag decoding algorithm generates, in step 202 of the flowchart of FIG. 2, at most three child nodes comprising a reference child node of the current node determined from the vector representing the received data signal, a first neighbor child node determined by subtracting a positive integer parameter from the value of the reference node, and a second neighbor child node determined by adding the positive integer parameter to the value of the reference child node. Child nodes are then selected in step 204 of the flowchart of FIG. 2 among the three child nodes. The selected child node can then be stored in a stack similarly to the SB-stack decoder together with their respective metric, the stack being then reordered by increasing order of the node metrics. The top node of the stack, thus obtained, is selected as the new current node to iterate the recursive search operation.

Further, although the invention has been described in relation with certain examples of the tree level dependent weighting coefficient, and particularly with certain examples of such weighting coefficient for illustrative purpose only, it should be understood that the invention is not limited to such examples.

Further, the various embodiments of the invention are not limited to particular types of detection, and apply both to hard and soft detection.

The invention claimed is:

1. A decoder for sequentially decoding a data signal received through a transmission channel in a communication system, said data signal carrying transmitted symbols, said decoder comprising a symbol estimation unit configured to determine estimated symbols representative of the transmitted symbols carried by the data signal from information stored in a stack, said symbol estimation unit being configured to iteratively fill the stack by expanding child nodes of a selected node of a decoding tree comprising a plurality of nodes, each node of the decoding tree corresponding to a candidate component of a symbol of said received data signal and each node being assigned a metric, the stack being filled at each iteration with a set of expanded child nodes and being ordered by increasing values of the metrics assigned to the nodes, the selected node for each iteration corresponding to the node being assigned the lowest metric in the stack, the decoder comprising a metric determination unit configured to determine an initial metric for each child node of said set of expanded child nodes, wherein the decoder further comprises a modified metric calculation unit configured to calculate a modified metric for at least one of the expanded child nodes from the metric associated with said expanded child node and a weighting coefficient, said weighting coefficient being a function of the level of said node in the decoding tree, the decoder assigning said modified metric to said at least one of the expanded child nodes.

2. The decoder of claim 1, wherein said metric determination unit) is configured to determine the initial metric for each child node of said set of expanded child nodes as a function of the Euclidean distance between a part of the received data signal received and the path between the root node of the decoding tree and said child node.

3. The decoder of claim 1, wherein said transmission channel is represented by a channel matrix and a QR decomposition is previously applied to said channel matrix where Q designates an orthogonal matrix and R an upper triangular matrix, and wherein the weighting coefficient at a given level i is a function of the $i^{th}$ diagonal entry ($R_{ii}$) of the upper triangular matrix (R) obtained from the QR decomposition of the channel matrix.

4. The decoder of claim 3, wherein said weighting coefficient is a function of the inverse of the $i^{th}$ diagonal entry ($R_{ii}$) of the upper triangular matrix (R) obtained from the QR decomposition of the equivalent channel matrix.

5. The decoder of claim 4, wherein said weighting coefficient further depends on the signal-to-noise ratio.

6. The decoder of claim 1, wherein said modified metric calculation unit is configured to reduce the initial metric by said weighting coefficient.

7. The decoder of claim 1, wherein the modified metric calculation unit is configured to calculate a modified metric for each expanded child node.

8. The decoder of claim 1, wherein the modified metric calculation unit is configured to calculate a modified metric for each node of said selected set of expanded child nodes.

9. The decoder of claim 1, wherein the metric determination unit is configured to assign said initial metric to each expanded node, and said modified metric calculation unit is configured to calculate a modified metric for each node stored in the stack, in response to the detection of a stack reordering condition, said decoder being further configured to reorder the stack by increasing values of the modified metrics associated with the nodes of the stack.

10. The decoder of claim 1, wherein said modified metric calculation unit is configured to calculate a modified metric for each expanded child node in response to the triggering of a termination alarm.

11. A receiver configured to receive and decode a data signal, wherein the receiver comprises a decoder according to claim 1 configured to decode said data signal.

12. A mobile device configured to transmit and receive a data signal in a wireless communication network, wherein the mobile device comprises a receiver according to claim 11 configured to receive and decode said data signal.

13. A method performed by the decoder of claim 1 for sequentially decoding the data signal received through the transmission channel in the communication system, the data signal carrying the transmitted symbols, the method comprising:

determining, by the symbol estimation unit, the estimated symbols representative of the transmitted symbols carried by the data signal from the information stored in the stack, the stack being filled by iteratively expanding the child nodes of the selected node of the decoding tree, the decoding tree comprising the plurality of nodes, the each node of the decoding tree corresponding to the candidate component of the symbol of the data signal and the each node being assigned the metric, the stack being filled at the each iteration with the set of the expanded child nodes and being ordered by increasing the values of the metrics associated with the nodes, the selected node for the each iteration corresponding to the node being assigned the lowest metric in the stack, determining, by the metric determination unit, the initial metric for the each child node of the set of the expanded child nodes, and calculating, by the modified metric calculation unit, the modified metric for the at least one of the expanded child nodes from the initial metric associated with the expanded child node and the weighting coefficient, the weighting coefficient being a function of the level of the node in the decoding tree, and assigning, by the decoder, the modified metric to the at least one of the expanded child nodes.

14. A computer program product comprises computer instructions stored on a non-transitory computer storage medium for configuring the decoder of claim 1 to decode the data signal received through the transmission channel in the communication system by determining the estimated symbols representative of the transmitted symbols carried by the data signal, the data signal carrying the transmitted symbols, the computer instructions when executed by a processor, cause:

the symbol estimation unit of the decoder to determine the estimated symbols representative of the transmitted symbols from the information stored in the stack, the stack being filled by iteratively expanding the child nodes of the selected node of the decoding tree, the decoding tree comprising the plurality of nodes, the each node of the decoding tree corresponding to the candidate component of the symbol of the data signal and the each node being assigned the metric, the stack being filled at the each iteration with the set of the expanded child nodes and being ordered by increasing the values of the metrics associated with the nodes, the selected node for the each iteration corresponding to the node being assigned the lowest metric in the stack, the metric determination unit of the decoder to determine the initial metric for the each child node of the set of the expanded child nodes, the symbol estimation unit of the decoder to calculate the modified metric for the at least one of the expanded child nodes from the initial metric associated with the expanded child node and the weighting coefficient, the weighting coefficient being a function of the level of the node in the decoding tree, and the decoder to assign the modified metric to the at least one of the expanded child nodes.

\* \* \* \* \*